US009896049B2

(12) United States Patent  (10) Patent No.: US 9,896,049 B2
Hiroki  (45) Date of Patent: Feb. 20, 2018

(54) VOICE RECOGNITION DEVICE AND VOICE RECOGNITION SYSTEM

(71) Applicant: TOYOTA JIDOSHA KABUSHIKI KAISHA, Toyota-shi, Aichi (JP)

(72) Inventor: Daisuke Hiroki, Toda (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/323,813

(22) PCT Filed: Jun. 11, 2015

(86) PCT No.: PCT/JP2015/066899
§ 371 (c)(1),
(2) Date: Jan. 4, 2017

(87) PCT Pub. No.: WO2016/006385
PCT Pub. Date: Jan. 14, 2016

(65) Prior Publication Data
US 2017/0166147 A1  Jun. 15, 2017

(30) Foreign Application Priority Data
Jul. 8, 2014 (JP) .................................. 2014-140676

(51) Int. Cl.
*B60W 10/06*  (2006.01)
*G10L 15/30*  (2013.01)
(Continued)

(52) U.S. Cl.
CPC ......... *B60R 16/0373* (2013.01); *B60W 10/06* (2013.01); *B60W 10/18* (2013.01); *B60W 10/30* (2013.01); *B60W 50/10* (2013.01); *G10L 15/222* (2013.01); *G10L 15/30* (2013.01); *B60W 2540/02* (2013.01); *B60W 2710/06* (2013.01); *B60W 2710/186* (2013.01);
(Continued)

(58) Field of Classification Search
CPC ........ B60W 10/06; B60W 50/10; G10L 15/30
USPC .......................................................... 701/36
See application file for complete search history.

(56) References Cited

U.S. PATENT DOCUMENTS 8,442,815 B2 * 5/2013 Okada ..................... G10L 15/26
704/10
2016/0290815 A1 * 10/2016 Tang ................... G01C 21/3453

FOREIGN PATENT DOCUMENTS

JP  2004-037953 A  2/2004
JP  2006-251298 A  9/2006

* cited by examiner

*Primary Examiner* — Tan Q Nguyen
(74) *Attorney, Agent, or Firm* — Andrews Kurth Kenyon LLP

(57) ABSTRACT

A voice recognition device includes a recognition processor configured to perform a voice recognition process that recognizes an input voice, a memory that stores information indicating a condition of a vehicle in association with information indicating a target state of an in-vehicle device targeted when changing from the condition and information of voice notification for confirming the change, and a control unit. The control unit is configured to control the in-vehicle device to enter the target state corresponding to the condition when the vehicle is in the vehicle condition stored in the memory and an input voice is recognized as a response to the voice notification corresponding to the condition, and to stop the voice recognition process performed by the recognition processor when recognizing that the state of the in-vehicle device is the target state.

5 Claims, 10 Drawing Sheets

(51) Int. Cl.
- *B60R 16/037* (2006.01)
- *B60W 10/18* (2012.01)
- *B60W 10/30* (2006.01)
- *B60W 50/10* (2012.01)
- *G10L 15/22* (2006.01)

(52) U.S. Cl.
CPC .... *B60W 2710/30* (2013.01); *G10L 2015/223* (2013.01); *G10L 2015/228* (2013.01)

Fig.2

| | Condition of vehicle | Notification content | State of in-vehicle device targeted when changing |
|---|---|---|---|
| 1 | (1) window = open<br>(2) engine stopped | Should window be closed? | Window that was open is closed. |
| 2 | (1) vehicle interior temperature is lower than average set temperature<br>(2) seat heater deactivated | Should seat heater be activated? | Seat heater is activated. |
| 3 | (1) vehicle interior temperature is higher than average set temperature<br>(2) seat heater activated | Should seat heater be deactivated? | Seat heater is deactivated. |
| 4 | (1) when vehicle is parked (ignition deactivated)<br>(2) blinker deactivated or hazard lamp deactivated | Should blinker be deactivated?<br>or<br>Should hazard lamp be deactivated? | Blinker is deactivated.<br>or<br>Hazard lamp is deactivated. |
| 5 | (1) automatic light condition satisfied (brightness = low)<br>(2) light deactivated | Should light be activated? | Light is activated. |
| 6 | (1) when vehicle is parked for long time (ignition deactivated for certain time)<br>(2) window = open or door = open (half-open) | Should window be closed?<br>or<br>Should door be closed? | Window is closed.<br>or<br>Door is closed. |
| 7 | (1) when vehicle is parked for long time (ignition deactivated for certain time)<br>(2) trunk open or hood open | Trunk is open.<br>or<br>Hood is open. | Trunk is closed.<br>or<br>Hood is closed. |
| 8 | (1) when vehicle is traveling (ignition activated)<br>(2) door = open (half-open) or parking brake activated | Should door be closed?<br>or<br>Should parking brake be deactivated? | Door is closed.<br>or<br>Parking brake is deactivated. |
| 9 | (1) when vehicle is traveling (ignition activated)<br>(2) seat belt deactivated | Please fasten seat belt. | Seat belt is fastened. |

VOICE RECOGNITION DEVICE AND VOICE RECOGNITION SYSTEM

CROSS-REFERENCE TO RELATED APPLICATIONS

This is a national phase application based on the PCT International Patent Application No. PCT/JP2015/066899 filed Jun. 11, 2015, claiming priority to Japanese Patent Application No. 2014-140676 filed Jul. 8, 2014, the entire contents of both of which are incorporated herein by reference.

TECHNICAL FIELD

The present invention relates to a voice recognition device and a voice recognition system that performs a voice recognition process in a vehicle such as an automobile.

BACKGROUND ART

A conventional voice recognition device is configured to perform a voice recognition process that recognizes voice generated by a vehicle occupant. Patent document 1 discloses one example of such a voice recognition device. The device described in patent document 1 is configured to automatically start a voice recognition process when a vehicle approaches a point that may be interesting to a driver and allow the driver to obtain information related to the point through a voice interaction.

PRIOR ART DOCUMENT

Patent Document

Patent Document 1: Japanese Laid-Open Patent Publication No. 2006-251298

SUMMARY OF THE INVENTION

Problems That Are to Be Solved by the Invention

It is usually difficult for such a conventional device including the device of the above publication to recognize a syllable that represents the end of a voice input from a driver. Thus, such a device recognizes that a voice input has ended on the condition that the voice input has continuously not been detected for a certain time. Accordingly, the certain time for determining this condition results in a tendency of increasing the time for stopping the voice recognition process.

It is an object of the present invention to provide a voice recognition device and a voice recognition system that avoids situations in which the duration of a voice recognition process becomes longer than necessary.

Means for Solving the Problem

A voice recognition device according to one aspect of the present invention includes a recognition processor configured to perform a voice recognition process that recognizes an input voice, a memory that stores information indicating a condition of a vehicle in association with information indicating a target state that is a state of an in-vehicle device targeted when changing from the condition and information of voice notification for confirming the change, and a control unit configured so that when the vehicle is in the vehicle condition stored in the memory and an input voice is recognized as a response to the voice notification corresponding to the condition, the control unit controls the in-vehicle device to enter the target state corresponding to the condition. The control unit is configured to stop the voice recognition process performed by the recognition processor when recognizing that the state of the in-vehicle device is the target state corresponding to the vehicle condition stored in the memory.

A voice recognition system according to one aspect of the present invention includes an information terminal having a voice input function and an external server that performs a voice recognition process that recognizes a voice transmitted from the information terminal and returns information indicating a recognition result of the voice to the information terminal. The information terminal includes a memory that stores information indicating a condition of a vehicle in association with information indicating a target state that is a state of an in-vehicle device targeted when changing from the condition and information of voice notification for confirming the change. The information terminal further includes a control unit configured so that when the vehicle is in the vehicle condition stored in the memory and information indicating a result of an input voice being recognized as a response to the voice notification corresponding to the condition is received from the external server, the control unit controls the in-vehicle device to enter the target state corresponding to the condition. The control unit is configured to transmit an instruction to the external server to stop the voice recognition process when recognizing that the state of the in-vehicle device is the target state corresponding to the vehicle condition stored in the memory.

BRIEF DESCRIPTION OF THE DRAWINGS

FIG. 2 is a table showing an example of information stored by the voice recognition device shown in FIG. 1 in association with the condition of the vehicle, in which states of an in-vehicle device targeted when changing and voice information of notification contents notified to confirm the change are shown.

EMBODIMENTS OF THE INVENTION

First Embodiment

A first embodiment of a voice recognition device will now be described with reference to FIGS. 1 to 5.

Figure 1:
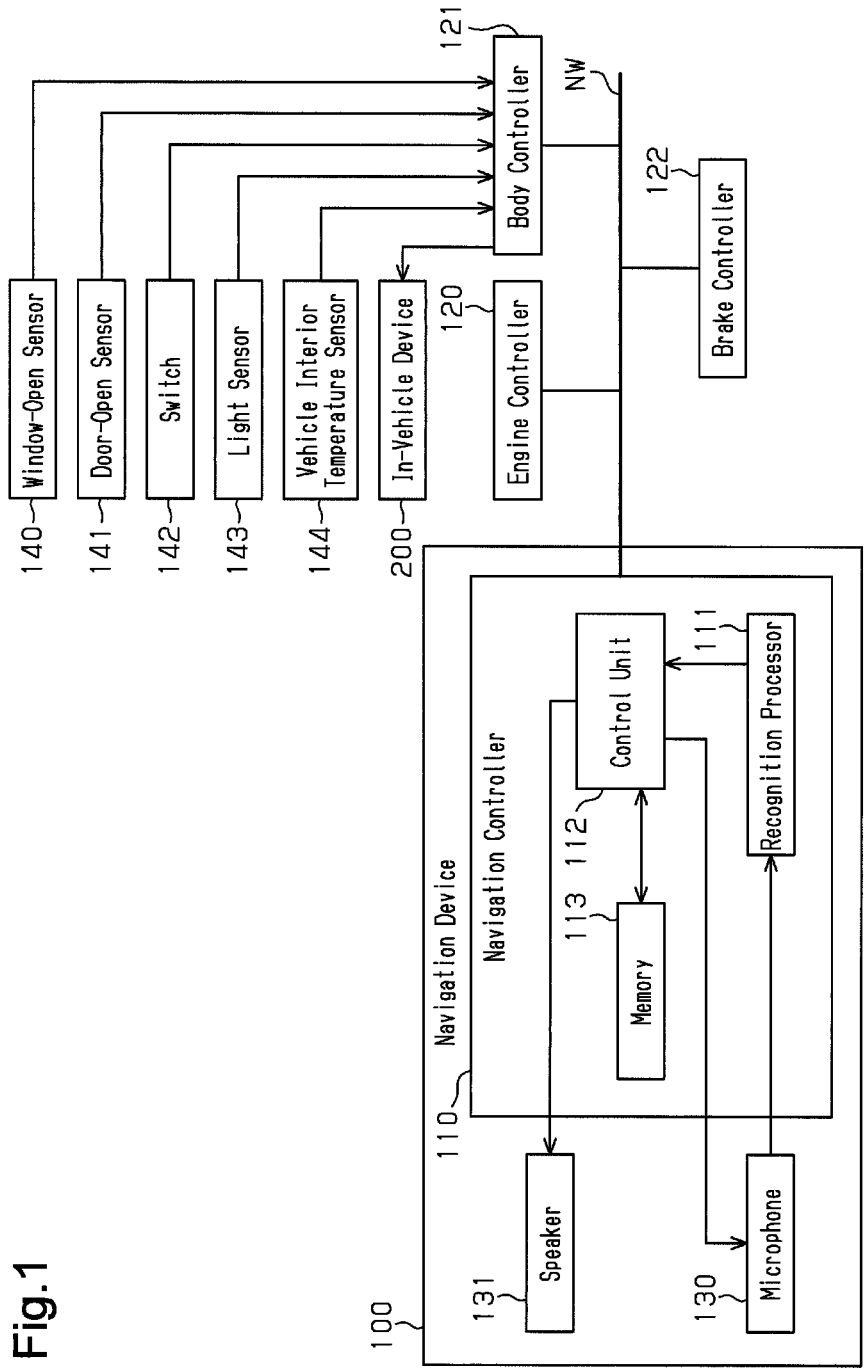
FIG. 1 is a block diagram showing the schematic configuration of a device in a vehicle to which a first embodiment of a voice recognition device is applied.

As shown in FIG. 1, a vehicle to which the voice recognition device of the present embodiment is applied includes a navigation device 100 that performs route guidance for a vehicle and functions as an information terminal. The navigation device 100 includes a controller, namely, a navigation controller 110. The navigation controller 110 is connected to various types of in-vehicle controllers such as an engine controller 120, a body controller 121, and a brake controller 122 via a vehicle network NW such as a controller area network (CAN). Each type of the in-vehicle controllers is an electronic control unit (ECU), namely, a processor or control circuitry, and includes a microcomputer including an arithmetic unit and a memory unit.

The navigation controller 110 includes a recognition processor 111 that performs a voice recognition process that recognizes a voice input via a microphone 130, which is arranged in the navigation device 100.

The recognition processor 111, for example, divides the voice input from the microphone 130 into multiple sections having a constant time width. Further, the recognition processor 111 performs dynamic programming (DP) matching or the like to compare feature vectors of the voice included in the divided sections with feature vectors of voice patterns that have been prepared in advance. Then, the recognition processor 111 analyzes and obtains the voice pattern having the highest feature vector similarity as the content of the voice generated in the section and translates the content of the obtained voice into text data. Further, a control unit 112 receives the translated text data from the recognition processor 111.

The control unit 112 compares the text data input from the recognition processor 111 with a speech content model. The control unit 112 analyzes and obtains the content of the compared speech from the model as the content of the speech generated by a vehicle occupant. In this case, the model is generated by applying a modeling method such as a Bayesian network or a decision tree to the text data of the content of speech that has been prepared in advance.

The control unit 112 transmits a control instruction to the in-vehicle controllers such as the body controller 121 and the brake controller 122 on a control condition that is in accordance with the analysis result of the content of speech and controls the operation of each in-vehicle device. More specifically, the control unit 112 transmits a control instruction to the body controller 121 to control the operation of an in-vehicle device 200 such as a window (more specifically, window motor), a door (more specifically, door motor), a seat heater, a blinker, or a hazard lamp. Further, the control unit 112 transmits a control instruction to the brake controller 122 to control the operation of an in-vehicle device such as a parking brake.

In addition, the control unit 112 monitors the operation of an in-vehicle device that is subject to control of each of the in-vehicle controllers based on the information received via the vehicle network NW from each of the in-vehicle controllers such as the engine controller 120, the body controller 121, and the brake controller 122.

A window-open sensor 140, a door-open sensor 141, a switch 142, a light sensor 143, a vehicle interior temperature sensor 144, and the like are connected to the body controller 121 as elements for obtaining information related to the condition of the vehicle. The window-open sensor 140 detects an open or closed state of a window. The door-open sensor 141 detects an open or closed state of a door. The switch 142 detects an activated or deactivated state of an ignition and an open or closed state of the trunk and the hood. The light sensor 143 detects the brightness outside the vehicle. The vehicle interior temperature sensor 144 detects the temperature inside the vehicle. The control unit 112 monitors the operation of the in-vehicle device 200 that is subject to control of the body controller 121 based on the information received from the sensors through the body controller 121.

The navigation controller 110 includes a memory 113. The memory 113 stores information indicating the condition of the vehicle, information indicating a target state that is a state of an in-vehicle device targeted when changing from the condition, and information of voice notification for confirming the change. The information is in association with one another. The state of an in-vehicle device targeted when changing (target state) corresponds to a state of the in-vehicle device that is to be obtained after the change, more specifically, a state of an in-vehicle device that needs to be operated after the device is actually operated. When the current condition of the vehicle matches a vehicle condition stored in the memory 113, the control unit 112 performs voice notification by outputting the voice notification information stored in the memory 113 in association with the condition to a speaker 131, which is arranged in the navigation device 100.

For instance, in example "1" of FIG. 2, a vehicle condition of "(1) window=open and (2) engine stopped" is associated with and voice notification information of "should window be closed?" and an in-vehicle device state (target state) of "window that was open is closed." When the vehicle occupant responds to the voice notification with a change instruction such as "yes," a control instruction is output from the control unit 112 to the body controller 121 to close the window.

In such a manner, in this example, when the vehicle is in a vehicle condition stored in the memory 113, if the input voice is recognized as a response to the corresponding voice notification for change confirmation, automatic change to the target state corresponding to the current condition of the in-vehicle device is performed. That is, the automatic change causes the state of the in-vehicle device to change to the target state corresponding to the current condition.

However, when the input voice is recognized as a response to the corresponding voice notification for change confirmation, if control is performed in broad terms to change the in-vehicle device to the target state corresponding to the current condition, the automatic change to the target state does not have to be performed. The control in broad terms includes, for example, an operation that prompts a vehicle occupant to be cautious.

For instance, in example "7" of FIG. 2, a vehicle condition of "(1) vehicle parked for a long time and (2) trunk=open (or hood=open)" is associated with an in-vehicle device state (target state) of "trunk closed (or hood closed)" and voice notification information of "the trunk is open (or the hood is open)." When the vehicle occupant responds to indicate that the vehicle occupant has acknowledged the voice notification, the voice notification for confirming the operation is issued at regular time intervals until the vehicle occupant provides a response indicating that an operation for closing the trunk or the hood has been completed. That is, in this example, when receiving voice recognized as a response to the corresponding voice notification for change confirmation, the automatic change to the target state of the in-vehicle device is not performed. However, control is executed to prompt the vehicle occupant to change the in-vehicle device to the target state corresponding to the current condition.

In the present embodiment, in the conditions of the vehicle stored in the memory 113, the voice recognition process is stopped when the in-vehicle device receives a stop interruption signal as a signal indicating change to the target state corresponding to the current condition from the corresponding in-vehicle controller. For example, each of the in-vehicle controllers such as the body controller 121 and the brake controller 122 outputs the state of the corresponding in-vehicle device to the navigation controller 110 when the state of the corresponding in-vehicle device changes to the target state corresponding to the condition of the vehicle.

The specific procedures of the voice recognition process performed by the navigation controller 110 as the operation for the devices of the present embodiment will now be described.

Figure 3:
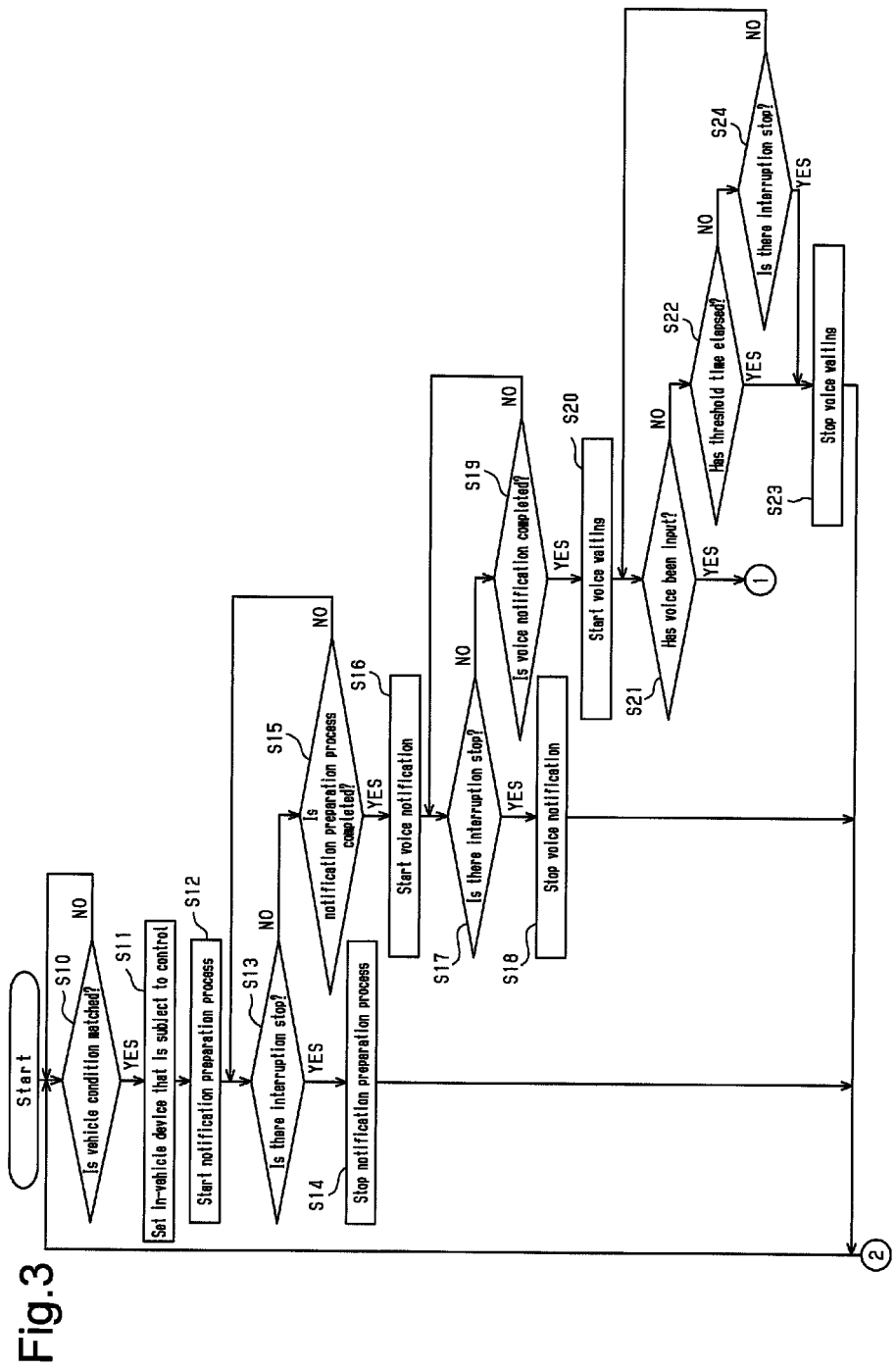
FIG. 3 is a flowchart showing the procedures of a voice recognition process performed by the voice recognition device shown in FIG. 1.
Figure 4:
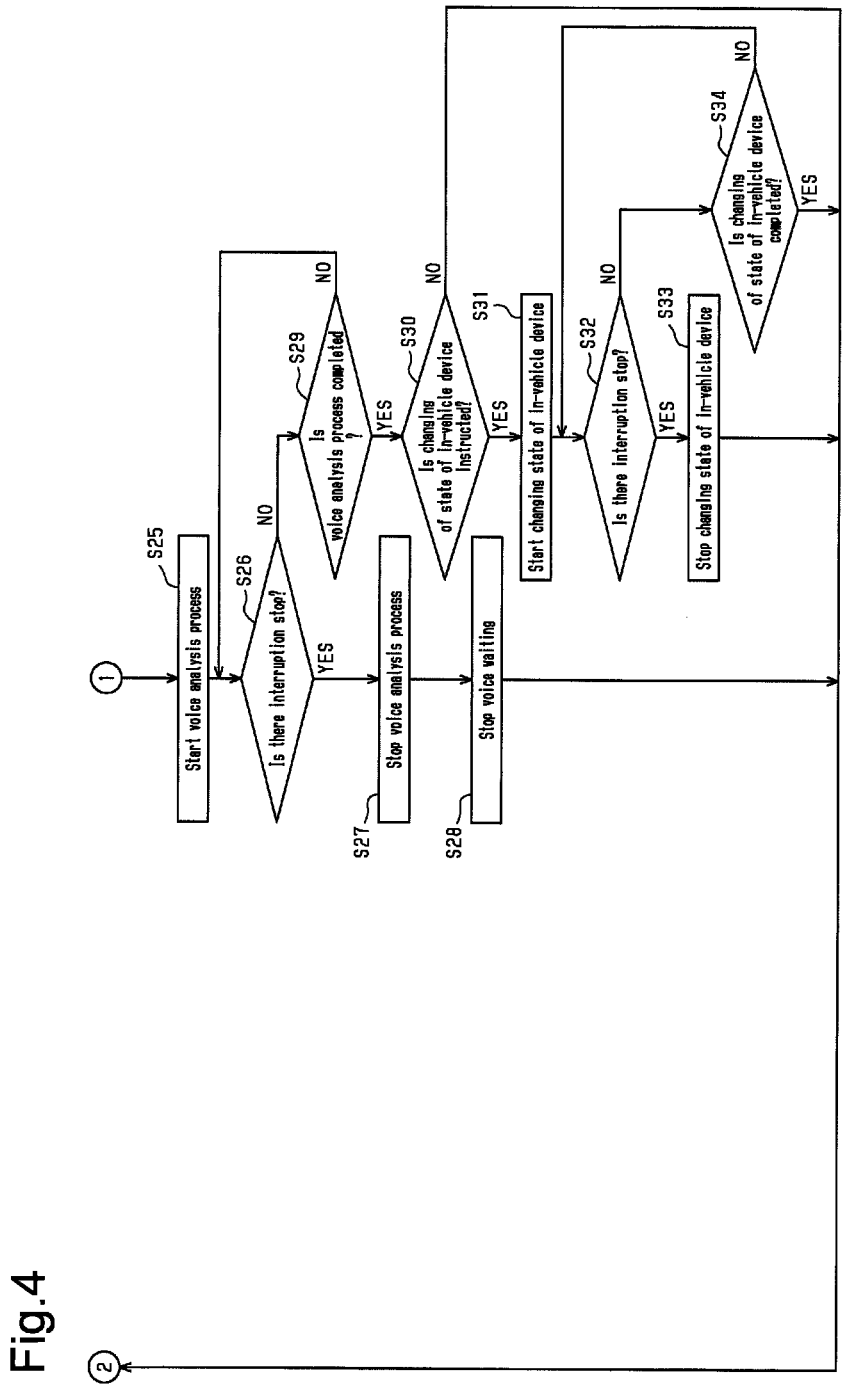
FIG. 4 is a flowchart showing the procedures of the voice recognition process performed by the voice recognition device shown in FIG. 1.

The navigation controller 110 performs the voice recognition process shown in FIGS. 3 and 4 on the condition that an electrical system is active (on) regardless of whether the vehicle is traveling or parked.

First, the navigation controller 110 waits until the current condition of the vehicle matches a condition of the vehicle stored in the memory 113 (step S10). When the current condition of the vehicle matches a condition of the vehicle stored in the memory 113 (step S10=YES), the in-vehicle device stored as a state targeted when changing is set as a control subject in association with the matched condition of the vehicle (step S11).

Then, the navigation controller 110 starts a notification preparation process (step S12). In the notification preparation process, the navigation controller 110 selects the words for the notification voice, transmits voice data to the speaker 131, and transmits an instruction that changes the microphone 130 to a voice waiting state.

Subsequently, the navigation controller 110 determines whether or not an interruption stop signal has been input from each of the in-vehicle controllers connected to the vehicle network NW (step S13). In this case, the navigation controller 110 determines for each in-vehicle device whether or not a stop interruption signal has been input from the in-vehicle controller that controls the operation of the in-vehicle device as a signal indicating that the in-vehicle device set as a control subject in the previous step S11 has reached the target state. For instance, when the current condition of the vehicle matches example "1" of FIG. 2, the navigation controller 110 sets a window as an in-vehicle device that is subject to control and determines whether or not a stop interruption signal has been input from the body controller 121 that controls the operation of the window as the signal indicating that the window has been closed.

When receiving the stop interruption signal (step S13=YES), the navigation controller 110 determines that the in-vehicle device has been recognized as being the target state corresponding to the condition of the vehicle stored in the memory 113 and stops the notification preparation process (step S14). Subsequently, the navigation controller 110 returns to step S10 and enters the waiting state. When the navigation controller 110 does not receive the stop interruption signal (step S13=NO), the navigation controller 110 determines whether or not the notification preparation process has been completed (step S15).

When the notification preparation process has not been completed (step S15=NO), the navigation controller 110 returns to step S13 and determines whether or not a stop interruption signal has been input until the notification preparation process is completed. When the notification preparation process has been completed without receiving the stop interruption signal (step S15=YES), the navigation controller 110 starts the voice notification (step S16). In the voice notification, the navigation controller 110 outputs, from the speaker 131, the voice notification information stored in the memory 113 in association with the vehicle condition based on the voice data transmitted to the speaker 131. For instance, when the current condition of the vehicle matches example "1" of FIG. 2, the navigation controller 110 outputs, from the speaker 131, the voice notification information of "should window be closed?" stored in association with the condition of the vehicle.

Then, the navigation controller 110 determines whether or not the stop interruption signal has been input from each of the in-vehicle controllers connected to the vehicle network NW (step S17). When receiving a stop interruption signal (step S17=YES), the navigation controller 110 determines that the state of the in-vehicle device has been recognized as being the target state corresponding to the condition of the vehicle stored in the memory 113 and stops voice notification (step S18). Subsequently, the navigation controller 110 returns to step S10 and enters the waiting state. When a stop interruption signal has not been input (step S17=NO), the navigation controller 110 determines whether or not the voice notification has been completed (step S19).

When the voice notification has not been completed (step S19=NO), the navigation controller 110 returns to step S17 and determines whether or not a stop interruption signal has been input until the voice notification is completed. When the voice notification is completed without receiving a stop interruption signal (step S19=YES), the navigation controller 110 starts voice waiting (step S20). In the voice waiting, the navigation controller 110 transmits an instruction that keeps the microphone 130 in the voice waiting state.

Subsequently, the navigation controller 110 determines whether or not a voice has been input by the vehicle occupant via the microphone 130 (step S21). When a voice has not been input (step S21=NO), the navigation controller 110 determines whether or not a predetermined threshold time has elapsed from when the voice notification was completed (step S22). The threshold time is set as a value serving as a reference for determining that the input of a voice from the vehicle occupant has ended when a voice is not continuously input. When a voice is not input even after a certain time elapses from when the voice notification was completed or when a switch is operated to prompt the vehicle occupant to input a voice to the speaker 131, the navigation controller 110 may perform voice notification that prompts the vehicle occupant to input a voice to the speaker 131.

If the threshold time has elapsed from when the voice notification was completed (step S22=YES), the navigation controller 110 stops the voice waiting (step S23). Then, the navigation controller 110 returns to step S10 and enters the waiting state. If the threshold time has not elapsed from when the voice notification was completed (step S22=NO), the navigation controller 110 determines whether or not a stop interruption signal has been input from each of the in-vehicle controllers connected to the vehicle network NW (step S24).

When a stop interruption signal has been input (step S24=YES), the navigation controller 110 determines that the state of the in-vehicle device has been recognized as being the target state corresponding to the condition of the vehicle stored in the memory 113 and stops the voice waiting (step S23). Then, the navigation controller 110 returns to step S10 and enters the waiting state. When a stop interruption signal has not been input (step S24=NO), the navigation controller 110 returns to step S21 and determines whether or not a voice has been input via the microphone 130 or determines whether or not a stop interruption signal has been input until the threshold time elapses from when the voice notification was completed.

Further, when a voice is input via the microphone 130 without receiving the stop interruption signal before the threshold time elapses from when the voice notification was completed (step S21=YES), the navigation controller 110 starts a voice analysis process (step S25). In the voice analysis process, the navigation controller 110 analyzes the content of a response input via the microphone 130 from the vehicle occupant in response to the voice notification that is output from the speaker 131.

Subsequently, the navigation controller 110 determines whether or not a stop interruption signal has been input from each of the in-vehicle controllers connected to the vehicle network NW (step S26). When a stop interruption signal has been input (step S26=YES), the navigation controller 110 determines that the state of the in-vehicle device has been recognized as being the target state corresponding to the condition of the vehicle stored in the memory 113 and stops the voice analysis process (step S27). Further, the navigation controller 110 stops the voice waiting (step S28). Then, the navigation controller 110 returns to step S10 and enters the waiting state. When the stop interruption signal is not input (step S26=NO), the navigation controller 110 determines whether or not the voice analysis process has been completed (step S29).

When the voice analysis process has not been completed (step S29=NO), the navigation controller 110 returns to step S26 and determines whether or not a stop interruption signal has been input until the voice analysis process is completed. When the voice analysis process has been completed without receiving a stop interruption signal (step S29=YES), the navigation controller 110 determines whether or not the content of the analyzed voice instructs changing of the state of the in-vehicle device (step S30).

When the content of the analyzed voice does not instruct changing of the state of the in-vehicle device (step S30=NO), the navigation controller 110 returns to step S10 and enters the waiting state. When the content of the analyzed voice instructs changing of the state of the in-vehicle device (step S30=YES), the navigation controller 110 starts changing the state of the in-vehicle device (step S31). In the changing of the state of the in-vehicle device, the navigation controller 110 transmits an instruction that has the in-vehicle device that is subject to control change the state based on the analysis result of the voice. For instance, when the current condition of the vehicle matches example "1" of FIG. 2, the navigation controller 110 outputs from the speaker 131 the voice notification information of "should window be closed?" stored in association with the condition of the vehicle. When the response of "yes" is input via the microphone 130 from the vehicle occupant, for example, the navigation controller 110 closes the window to achieve the targeted closed state.

Subsequently, the navigation controller 110 determines whether or not a stop interruption signal has been input from each of the in-vehicle controllers connected to the vehicle network NW (step S32). When a stop interruption signal has been input (step S32=YES), the navigation controller 110 determines that the state of the in-vehicle device has been recognized as being the target state corresponding to the condition of the vehicle stored in the memory 113 and stops changing the state of the in-vehicle device (step S33). Then, the navigation controller 110 returns to step S10 and enters the waiting state. The navigation controller 110 may stop changing the in-vehicle device if the voice input of the vehicle occupant includes a stop instruction when changing the state of the in-vehicle device. In this case, the navigation controller 110 may determine whether or not a stop instruction exists by analyzing the content of the voice input or always determine that a stop instruction has been issued when there is a voice input without analyzing the content of the input voice when changing the state of the in-vehicle device.

Further, when a stop interruption signal has not been input (step S32=NO), the navigation controller 110 determines whether or not the changing of the state of the in-vehicle device has been completed (step S34). When the changing of the state of the in-vehicle device has not been completed (step S34=NO), the navigation controller 110 returns to step S32 and determines whether or not a stop interruption signal has been input until the changing of the state of the in-vehicle device is completed. When the changing of the state of the in-vehicle device is completed without receiving the stop interruption signal (step S34=YES), the navigation controller 110 returns to step S10 and enters the waiting state.

The operation of the navigation controller 110 of the present embodiment, in particular, when the stop interruption signal is input during the voice analysis process, will now be described.

Figure 5:
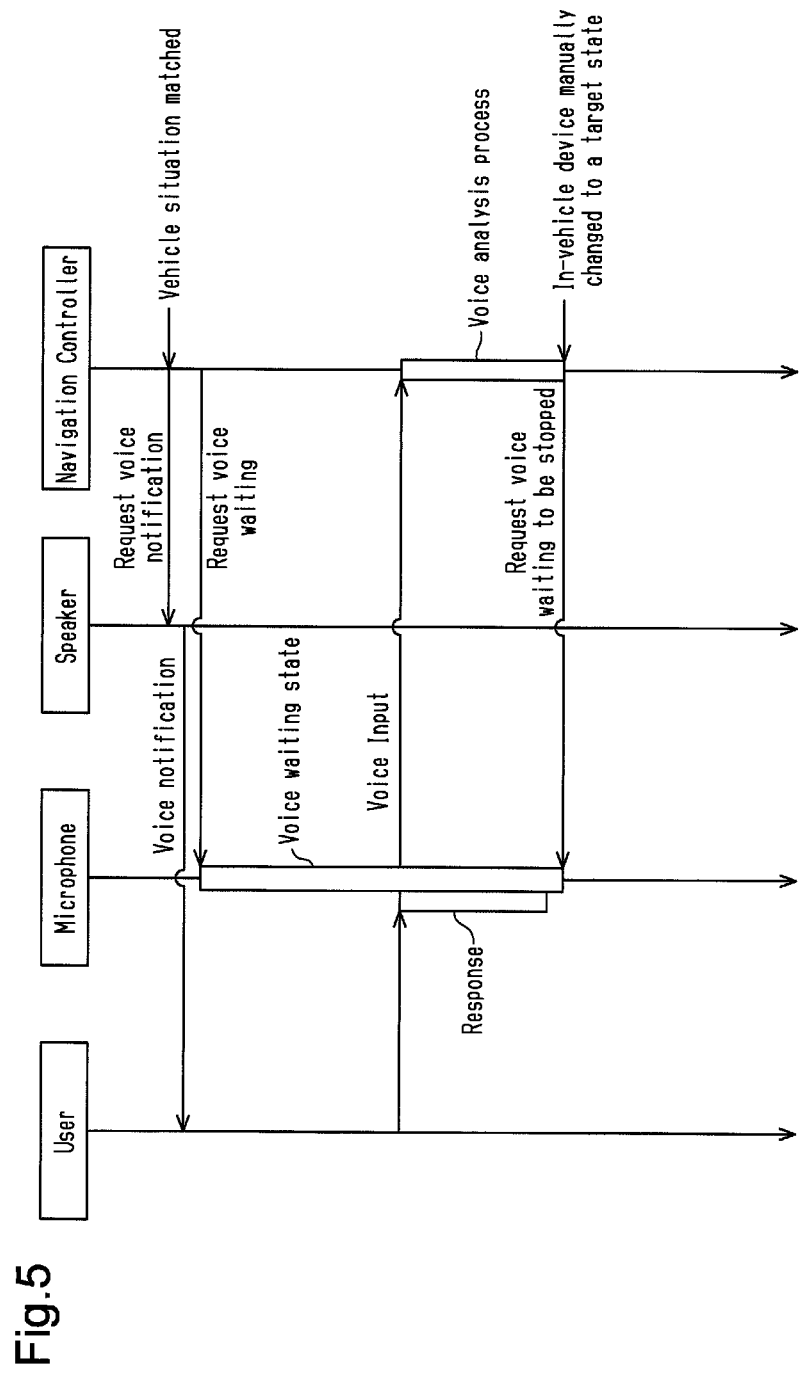
FIG. 5 is a sequence chart showing the flow of a control signal when the voice recognition device shown in FIG. 1 performs the voice recognition process.

As shown in FIG. 5, in the present embodiment, when the current condition of the vehicle matches a condition of the vehicle stored in the memory 113, the navigation controller 110 requests the speaker 131 to issue voice notification. The speaker 131 issues voice notification to the vehicle occupant in accordance with the voice notification request. At the same time, the navigation controller 110 requests the microphone 130 to wait for a voice. The microphone 130 enters a voice waiting state in accordance with the voice waiting request.

Subsequently, when the vehicle occupant responds through the microphone 130 that is in the voice waiting state, the navigation controller 110 receives a signal of the response from the microphone 130 and performs a voice analysis process on the input signal of the response.

When the navigation controller 110 is performing the voice analysis control, the state of the in-vehicle device may be manually changed to the target state without the voice recognition being performed. For instance, the window may be manually closed by operating a switch or the like while the analysis process is being performed on the response of "yes" from the vehicle occupant for the voice notification of "should window be closed?" from the microphone 130 when the current condition of the vehicle matches example "1" of FIG. 2. In this case, the navigation controller 110 immediately stops the voice analysis process and requests the microphone 130 to stop waiting for a voice.

More specifically, the navigation controller 110 usually cannot recognize the part of a voice input by a vehicle occupant that is a conversation. Thus, a state in which there is no voice input has to become longer than the threshold time for the navigation controller 110 to determine that the voice input has ended, and the navigation controller 110 thereby maintains the voice waiting state. If the navigation controller 110 reduces the length of the threshold time to shorten the voice waiting state, the navigation controller 110 may erroneously recognize the end of a voice input of the vehicle occupant and cancel the voice waiting state even though a conversation has not ended. If the navigation controller 110 prolongs the threshold time to avoid such an erroneous recognition, the waiting state for a response to a voice input after the voice input ends would be prolonged. Moreover, noise or the like in the vehicle may be erroneously recognized as a conversation during the prolonged time, and the response waiting state may become longer than necessary.

In the present embodiment, once recognizing that the in-vehicle device has been manually changed to the target state, the navigation controller 110 no longer needs to change the state of the in-vehicle device based on voice recognition. In this case, even when a state in which there is no voice input does not become longer than the threshold time, the navigation controller 110 immediately stops the voice analysis process and the voice waiting of the microphone 130. This avoids the voice analysis process and the voice waiting state of the microphone 130 from being longer than necessary.

As described above, the first embodiment has the following advantages.

(1) Prior to voice notification for confirming the changing of the state of the in-vehicle device or prior to a response from the driver to the voice recognition, the voice recognition process is immediately stopped when the state of the in-vehicle device is recognized as having reached the target state associated with the condition of the vehicle. This avoids the voice recognition process from being longer than necessary.

(2) An in-vehicle device that requires an opening/closing operation or an activation/deactivation, such as a window or a light, serves as a subject of control. This allows for a highly convenient control to be executed without the voice recognition process being longer than necessary.

(3) Even when the control unit 112 adds an in-vehicle device that is subject to control based on voice recognition, the desired new in-vehicle device only needs to be connected to the vehicle network NW although the memory 113 needs to undergo updating or the like. This increases the flexibility and versatility when using the voice recognition device.

Second Embodiment

A second embodiment of a voice recognition device will now be described with reference to FIG. 6. The second embodiment differs from the first embodiment in that the input and output of a voice to and from a vehicle occupant is performed using a mobile information terminal such as a smartphone or a tablet terminal. Thus, the following description focuses on the configuration that differs from the first embodiment. The configuration that is the same as or corresponds to the first embodiment will not be described.

Figure 6:
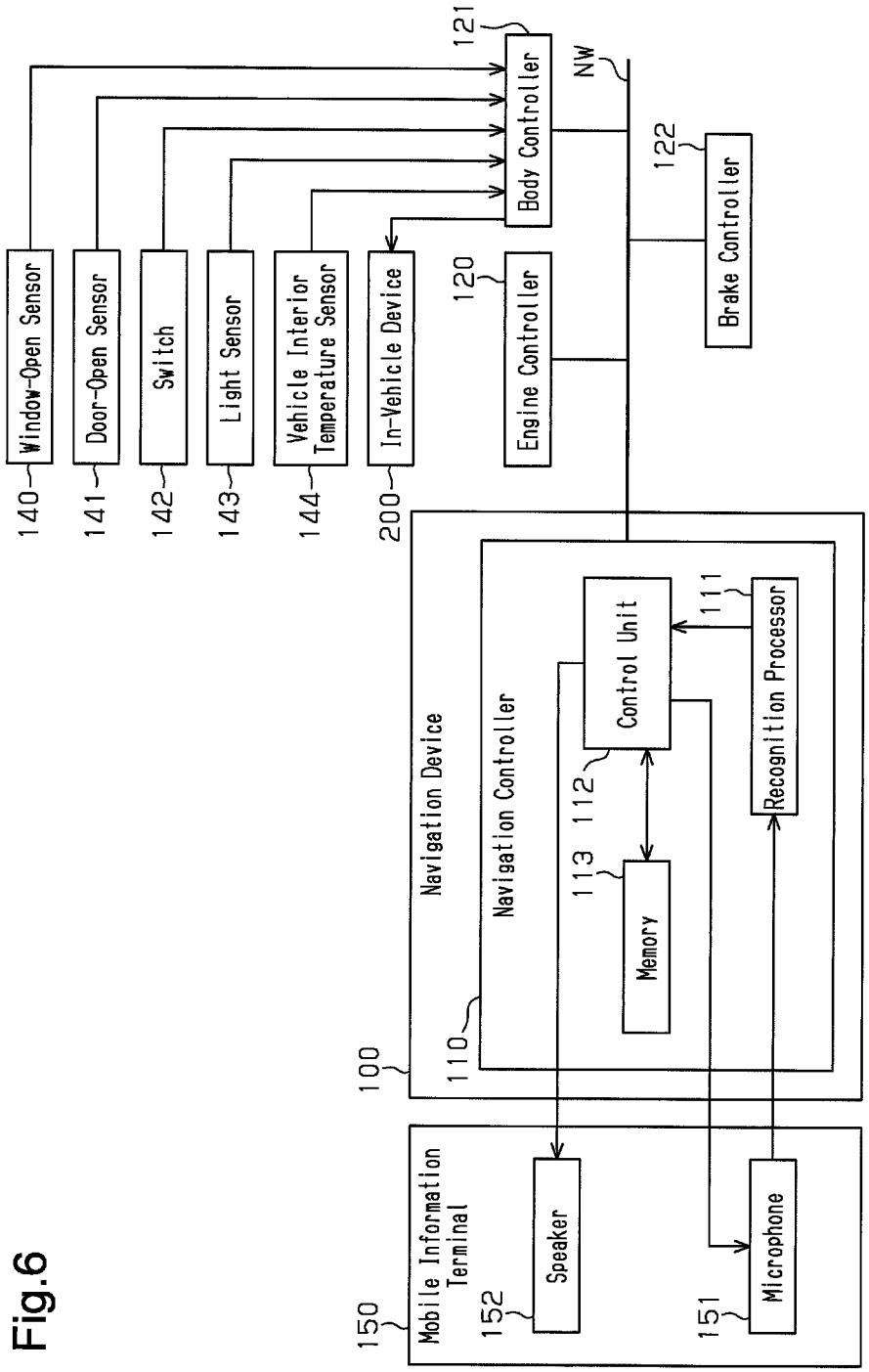
FIG. 6 is a block diagram showing the schematic configuration of a device in a vehicle to which a second embodiment of a voice recognition device is applied.

As shown in FIG. 6, the navigation controller 110 of the present embodiment is connected to a mobile information terminal 150 in a wired or wireless manner so that information is communicable. The mobile information terminal 150 includes a microphone 151 and a speaker 152. The recognition processor 111 of the navigation controller 110 receives a voice input via the microphone 151, which is arranged in the mobile information terminal 150. Further, when the current condition of the vehicle matches a condition of the vehicle stored in the memory 113, the control unit 112 of the navigation controller 110 outputs voice notification information stored in the memory 113 in association with the condition to the speaker 152, which is arranged in the mobile information terminal 150, and performs voice notification.

When the state of the in-vehicle device is manually changed to the target state without voice recognition being performed while the navigation controller 110 is performing the voice analysis process, the navigation controller 110 immediately stops the voice analysis process and requests the microphone 151, which is arranged in the mobile information terminal 150, to stop voice waiting.

Accordingly, the second embodiment has the same advantages (1) to (3) as the first embodiment.

Third Embodiment

A third embodiment of a voice recognition device will now be described with reference to FIGS. 7 and 8. The third embodiment differs from the first embodiment in that the navigation controller does not have the voice recognition function and in that a management center that transmits and receives information through wireless communication to and from the navigation controller performs the voice recognition process. Thus, the following description focuses on the configuration that differs from the first embodiment. The configuration that is the same as or corresponds to the first embodiment will not be described.

Figure 7:
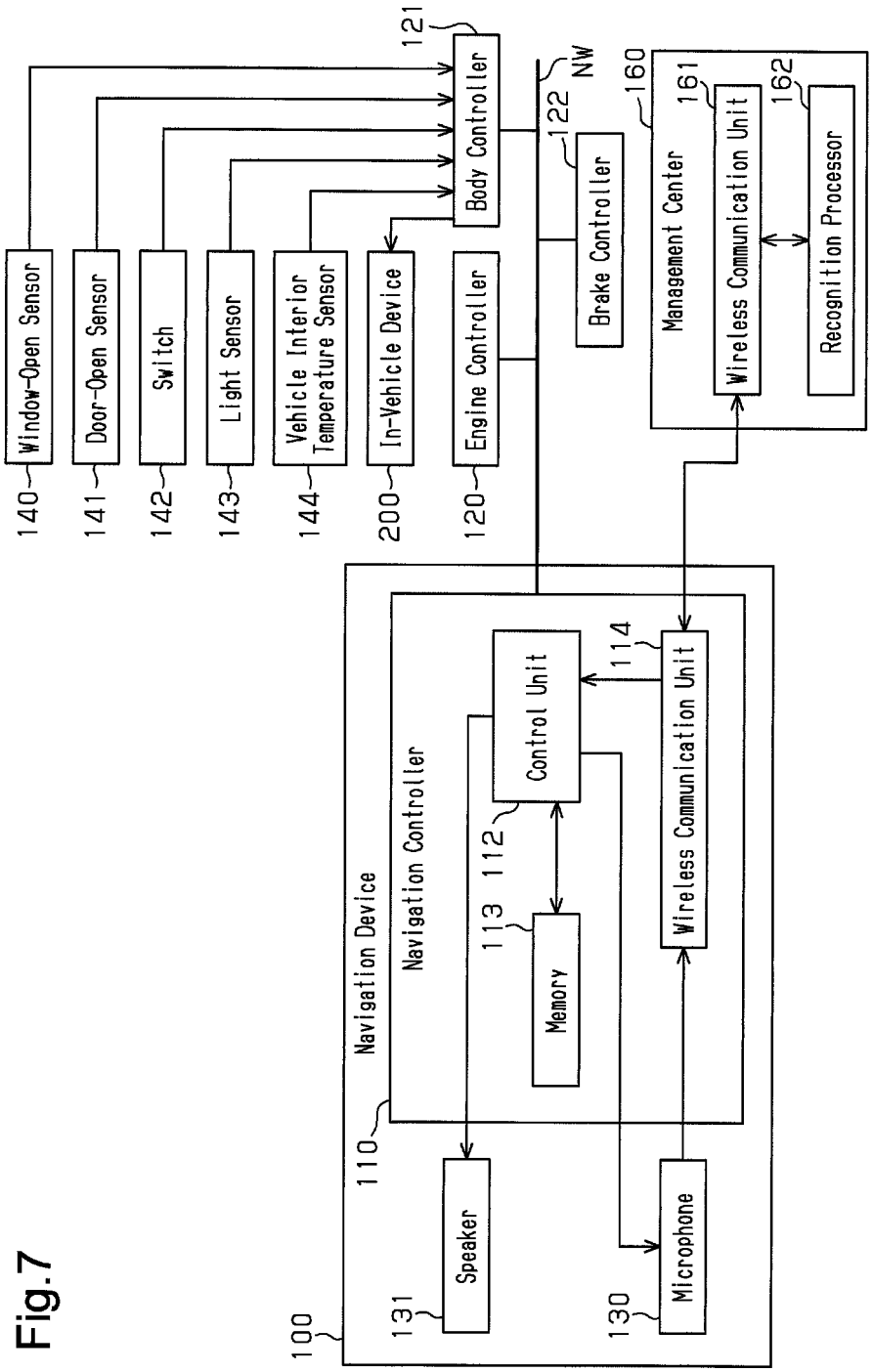
FIG. 7 is a block diagram showing the schematic configuration of a device in a vehicle and a management center to which a third embodiment of a voice recognition system is applied.

As shown in FIG. 7, the voice recognition system of the present embodiment includes the navigation device 100 and a management center 160 that functions as an external server. The navigation controller 110 includes a wireless communication unit 114 that transmits and receives information through wireless communication to and from a wireless communication unit 161 of the management center 160. The wireless communication unit 114 of the navigation controller 110 receives a voice input via the microphone 130, which is arranged in the navigation device 100. The wireless communication unit 114 transmits the voice input to the wireless communication unit 161 of the management center 160 through wireless communication.

The management center 160 includes a recognition processor 162 that performs a voice recognition process on the voice input by the navigation controller 110 via the wireless communication unit 161. The management center 160 transmits text data recognized by the recognition processor 162 to the navigation controller 110 via the wireless communication unit 161.

The control unit 112 of the navigation controller 110 controls the operations of in-vehicle devices by analyzing the content of speech based on the text data that is input from the management center 160 and transmitting a control instruction to each of the in-vehicle controllers such as the body controller 121 and the brake controller 122 on a control condition that is in accordance with the analysis result of the content of the speech.

Figure 8:
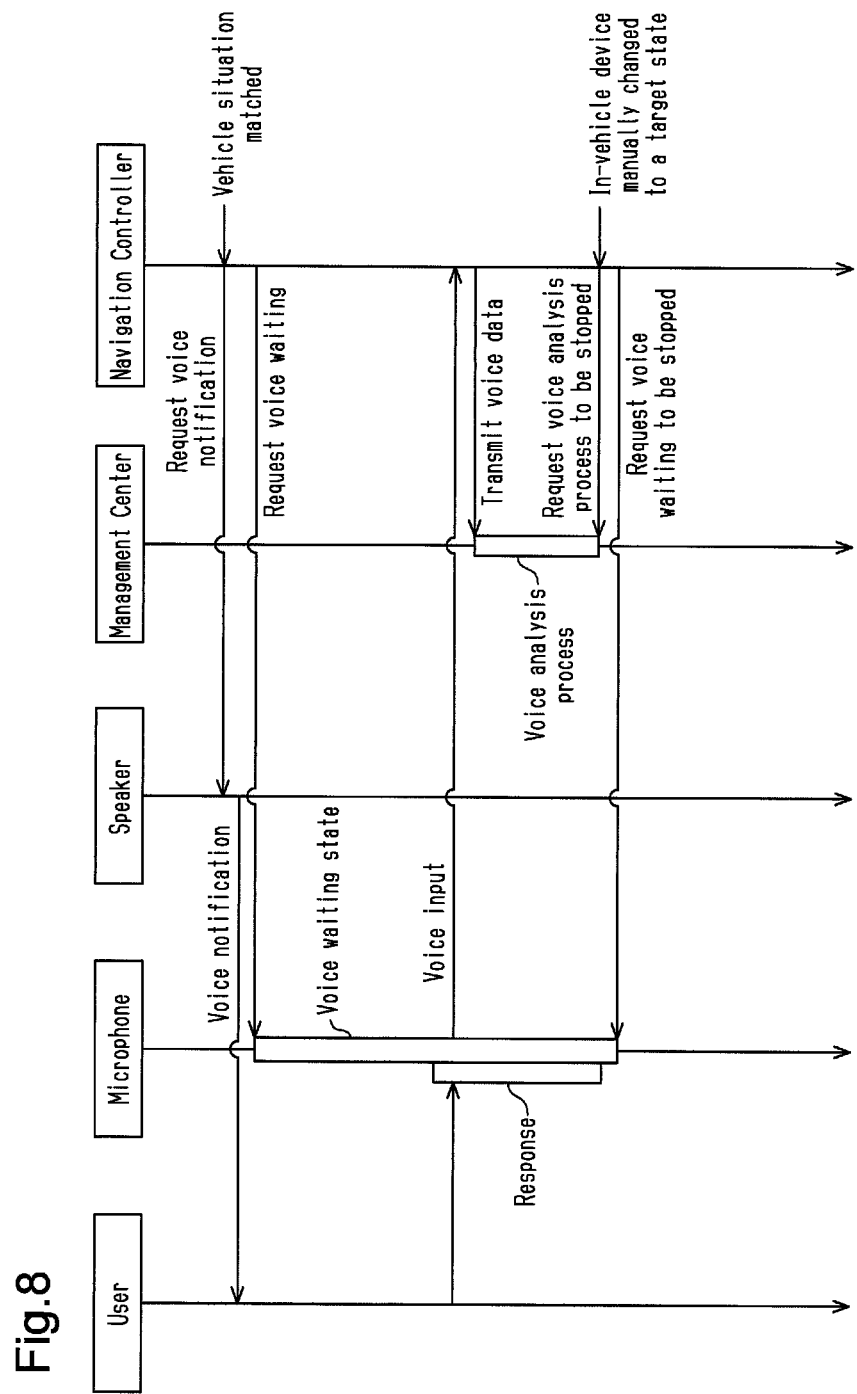
FIG. 8 is a sequence chart showing the flow of a control signal when the voice recognition system shown in FIG. 7 performs the voice recognition process.

As shown in FIG. 8, in the present embodiment, when the current condition of the vehicle matches a condition of the vehicle stored in the memory 113, the navigation controller 110 requests the speaker 131 to issue voice notification. The speaker 131 issues voice notification to the vehicle occupant in accordance with the voice notification request. At the same time, the navigation controller 110 requests the microphone 130 to wait for a voice. The microphone 130 enters a voice waiting state in accordance with the voice waiting request.

Subsequently, when the vehicle occupant responds through the microphone 130 that is in the voice waiting state, the navigation controller 110 receives a signal of the response from the microphone 130 and transmits the input signal of the response to the management center 160. Then, the management center 160 performs the voice analysis process on the input signal of the response.

When the state of the in-vehicle device is manually changed to the target state without voice recognition being performed while the management center 160 is performing the voice analysis process, the navigation controller 110 immediately requests the management center 160 to stop the voice analysis process and requests the microphone 130 to stop voice waiting.

Accordingly, the third embodiment has the following advantage in addition to the same advantages (1) to (3) as the first embodiment.

(4) When a voice recognition process has to be performed over a large scale and with higher accuracy, the facility and resource of the management center 160 can be optimized.

Fourth Embodiment

A fourth embodiment of a voice recognition system will now be described with reference to FIGS. 9 and 10. The fourth embodiment differs from the first embodiment in that the navigation controller does not have the voice recognition function and in that an external server that transmits and receives information through wireless communication to and from a mobile information terminal such as a smartphone and a tablet terminal performs the voice recognition process. Thus, the following description focuses on the configuration that differs from the first embodiment. The configuration that is the same as or corresponds to the first embodiment will not be described.

Figure 9:
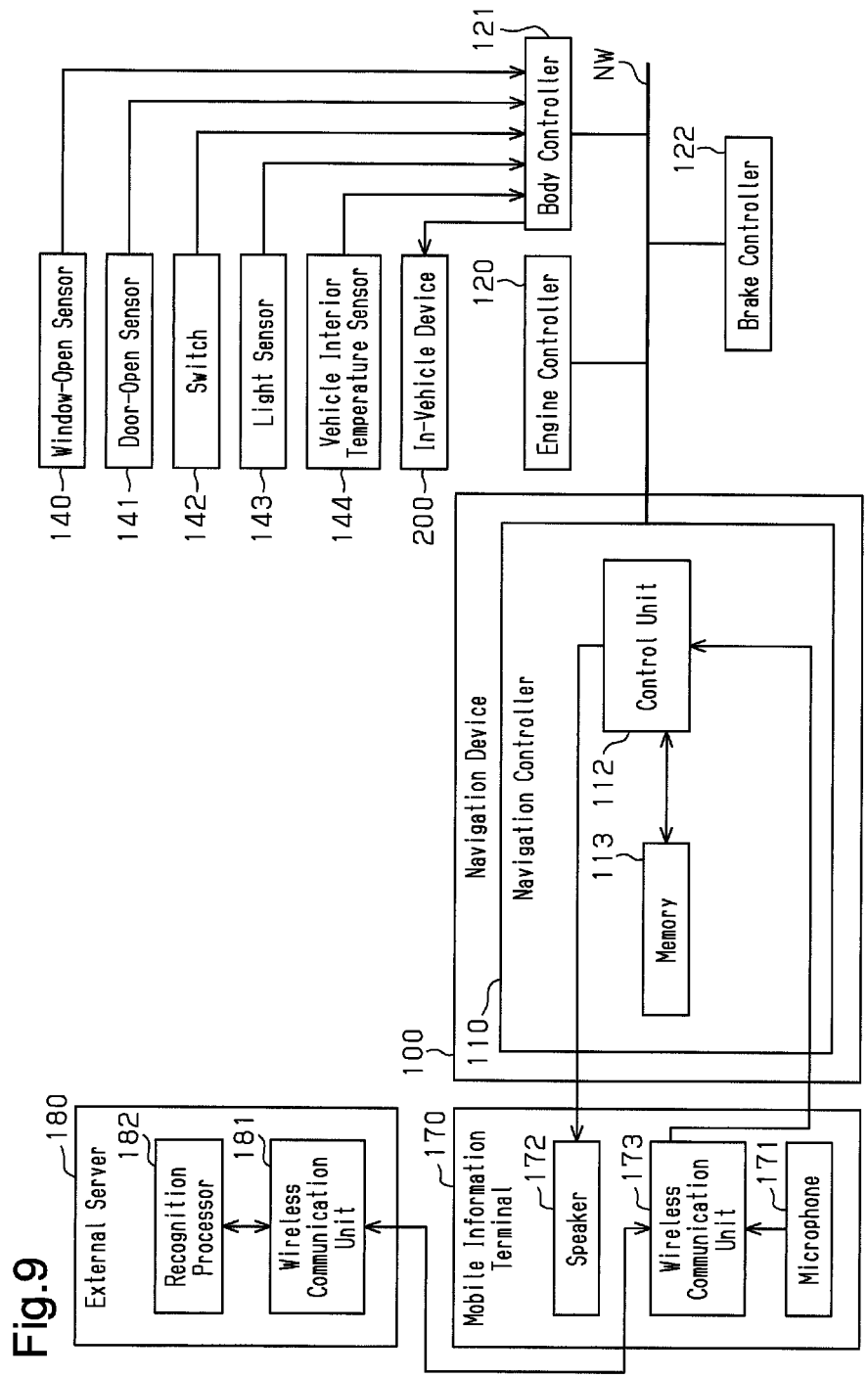
FIG. 9 is a block diagram showing the schematic configuration of a device in a vehicle and an external server to which a fourth embodiment of a voice recognition system is applied.

As shown in FIG. 9, the voice recognition system of the present embodiment includes the navigation controller 110, a mobile information terminal 170, and an external server 180. The navigation controller 110 is connected to the mobile information terminal 170 in a wired or wireless manner so that information is communicable. The mobile information terminal 170 includes a microphone 171 and a speaker 172. In the present embodiment, the navigation controller 110 and the mobile information terminal 170 are elements of an information terminal that includes the memory 113 and the control unit 112. The information terminal also transmits and receives information to and from the external server 180. Further, the mobile information terminal 170 includes a wireless communication unit 173 that performs wireless communication to transmit and receive information to and from a wireless communication unit 181 of the external server 180. The wireless communication unit 173 of the mobile information terminal 170 receives a voice input via the microphone 171, which is arranged in the mobile information terminal 170. The wireless communication unit 173 transmits the input voice to the wireless communication unit 181 of the external server 180 through wireless communication.

The external server 180 includes a recognition processor 182 that performs a voice recognition process on the input voice from the mobile information terminal 170 via the wireless communication unit 181. The external server 180 transmits text data recognized by the recognition processor 182 to the mobile information terminal 170 via the wireless communication unit 181.

The wireless communication unit 173 of the mobile information terminal 170 transmits text data input from the external server 180 to the control unit 112 of the navigation controller 110. The control unit 112 of the navigation controller 110 controls the operations of the in-vehicle device by analyzing the content of speech based on the text data input from the external server 180 via the mobile information terminal 170 and transmitting a control instruction to each of the in-vehicle controllers such as the body controller 121 and the brake controller 122 on a control condition that is in accordance with the analysis result of the content of the speech.

Figure 10:
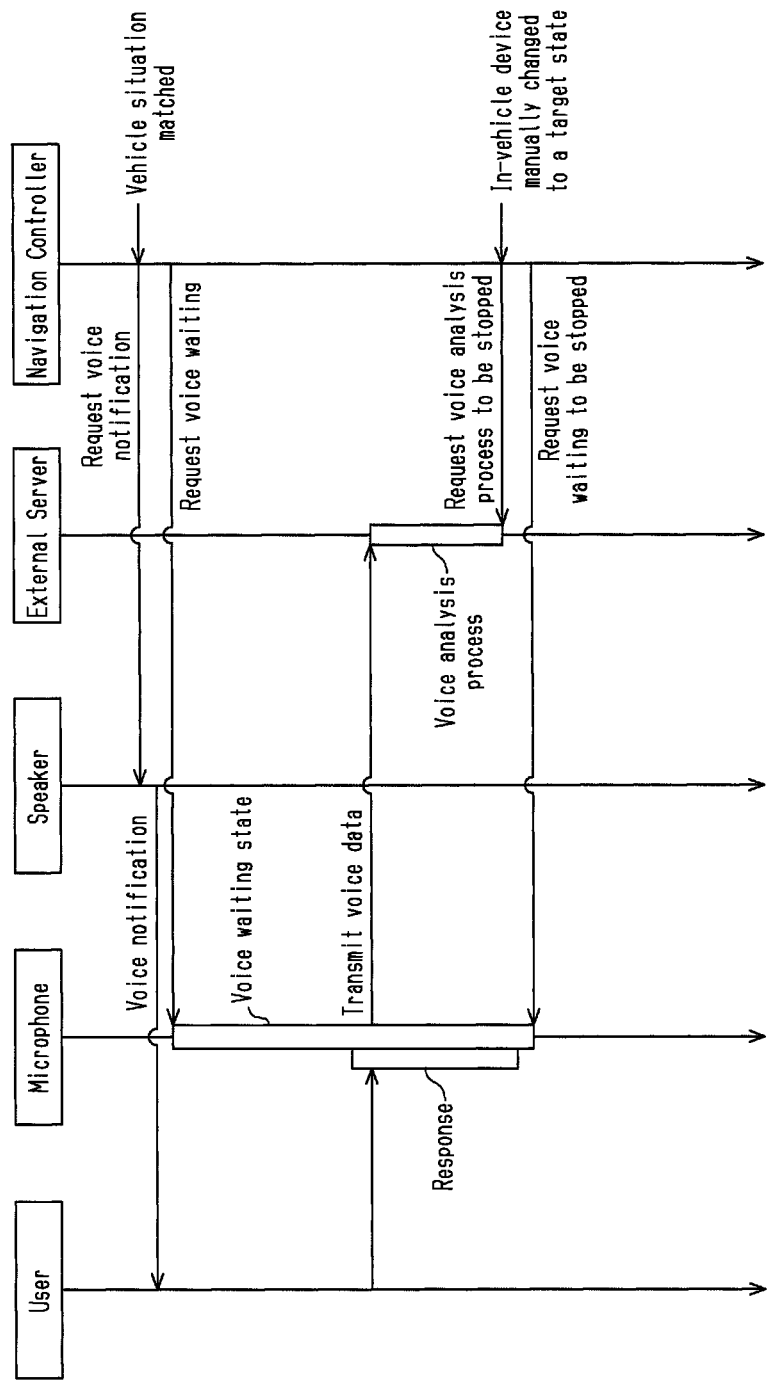
FIG. 10 is a sequence chart showing the flow of a control signal when the voice recognition system shown in FIG. 9 performs the voice recognition process.

As shown in FIG. 10, in the present embodiment, when the current condition of the vehicle matches a condition of the vehicle stored in the memory 113, the navigation controller 110 requests the speaker 172 to issue voice notification. Then, the speaker 172 performs voice notification on the vehicle occupant in accordance with the voice notification request. At the same time, the navigation controller 110 requests the microphone 171 to wait for a voice. The microphone 171 enters the voice waiting state in accordance with the voice waiting request.

Subsequently, when the vehicle occupant responds through the microphone 171 that is in the voice waiting state, the navigation controller 110 transmits a signal of the response from the microphone 171 to the external server 180. The external server 180 performs the voice analysis process on the received signal of the response.

When the state of the in-vehicle device is manually changed to the target state without voice recognition being performed while the external server 180 is performing the voice analysis process, the navigation controller 110 immediately requests the external server 180 via the mobile information terminal 170 to stop the voice analysis process and requests the microphone 171 to stop voice waiting.

Accordingly, the fourth embodiment has the following advantage based on advantage (4) of the third embodiment in addition to the same advantages (1) to (3) as the first embodiment.

(5) When a voice recognition process has to be performed over a large scale and with higher accuracy, the facility and resource of the external server 180 can be optimized.

OTHER EMBODIMENTS

Each of the above embodiments may be implemented in the following embodiments.

In each of the above embodiments, target states that respectively correspond to a plurality of in-vehicle devices may be associated with a single condition of a vehicle. For example, a vehicle condition of "(1) vehicle interior temperature=low and (2) seat heater deactivated" may be associated with an in-vehicle device state of "seat heater is activated" and an in-vehicle device state of "air conditioner is activated." In this case, it is preferred that the control unit 112 of the navigation controller 110 stop the voice recognition process when recognizing that the in-device vehicles have all reached the corresponding target states, respectively. When a plurality of in-vehicle devices are associated with a vehicle condition, this configuration avoids situations in which the voice recognition process is stopped before some of the in-vehicle devices are changed to the target states.

In the second embodiment, the voice recognition process may be performed by the mobile information terminal 150 that transmits and receives information to and from the navigation controller 110 as long as the mobile information terminal 150 has the voice recognition function.

In the fourth embodiment, the mobile information terminal 170 may check whether or not the current condition of the vehicle matches the condition of the vehicle stored in the memory 113 as long as the mobile information terminal 170 can obtain information related to the state of the in-vehicle device from the in-vehicle controller or the like connected to the vehicle network NW. In this case, the mobile information terminal 170 includes the memory 113 and the control unit 112 and functions as an information terminal that transmits and receives to and from the external server 180.

In each of the above embodiments, the in-vehicle device that is subject to control based on the voice recognition process is not limited to the in-vehicle device connected to the navigation controller 110 via the vehicle network NW and may be an in-vehicle device that is directly connected to the navigation controller 110 without using the vehicle network NW.

In each of the above embodiments, among the in-vehicle controllers connected to the in-vehicle network NW, a device other than the navigation controller 110 may check whether or not the current condition of the vehicle matches a condition of the vehicle stored in the memory 113.

What is claimed is:

1. A voice recognition device comprising:
    a recognition processor configured to perform a voice recognition process that recognizes an input voice;
    a memory that stores information indicating a condition of a vehicle in association with information indicating a target state that is a state of an in-vehicle device targeted when changing from the condition and information of voice notification for confirming the change; and
    a control unit configured so that when the vehicle is in the vehicle condition stored in the memory and an input voice is recognized as a response to the voice notification corresponding to the condition, the control unit controls the in-vehicle device to enter the target state corresponding to the condition,
    wherein the control unit is configured to stop the voice recognition process performed by the recognition processor when recognizing that the state of the in-vehicle device is the target state corresponding to the vehicle condition stored in the memory.

2. The voice recognition device according to claim 1, wherein
    the target state is a state after operation of an in-vehicle device that needs to be operated, and
    the control unit is configured to perform control, as the control for changing a state of the in-vehicle device to the target state, for automatically changing the state of the in-vehicle device to the state after the operation.

3. The voice recognition device according to claim 1, wherein when target states that respectively correspond to a plurality of in-vehicle devices are stored in the memory in association with a single vehicle condition, the control unit is configured to stop the voice recognition process performed by the recognition processor when recognizing that the in-vehicle devices have all reached the corresponding target states.

4. The voice recognition device according to claim 1, wherein
    the control unit is connected via a vehicle network to one or more in-vehicle controllers, each configured to control a state of a corresponding in-vehicle device,
    the one or more in-vehicle controllers are each configured to output the state of the corresponding in-vehicle device to the control unit via the vehicle network when the state of the corresponding in-vehicle device changes to the target state, and
    the control unit is configured to stop the voice recognition process performed by the recognition processor when an input state of an in-vehicle device matches the target state of the corresponding in-vehicle device stored in the memory.

5. A voice recognition system comprising:
    an information terminal having a voice input function; and
    an external server that performs a voice recognition process that recognizes a voice transmitted from the information terminal and returns information indicating a recognition result of the voice to the information terminal, wherein
    the information terminal includes:
    a memory that stores information indicating a condition of a vehicle in association with information indicating a target state that is a state of an in-vehicle device targeted when changing from the condition and information of voice notification for confirming the change; and
    a control unit configured so that when the vehicle is in the vehicle condition stored in the memory and information indicating a result of an input voice being recognized as a response to the voice notification corresponding to the condition is received from the external server, the control unit controls the in-vehicle device to enter the target state corresponding to the condition,
    wherein the control unit is configured to transmit an instruction to the external server to stop the voice recognition process when recognizing that the state of the in-vehicle device is the target state corresponding to the vehicle condition stored in the memory.

* * * * *